(12) United States Patent
Sato et al.

(10) Patent No.: US 9,869,472 B2
(45) Date of Patent: Jan. 16, 2018

(54) GARBAGE SUPPLY DEVICE

(75) Inventors: Jun Sato, Tokyo (JP); Toshimasa Shirai, Yokohama (JP); Yoshihisa Saito, Yokohama (JP); Norio Yoshimitsu, Yokohama (JP); Yasunori Terabe, Yokohama (JP)

(73) Assignee: MITSUBISHI HEAVY INDUSTRIES ENVIRONMENTAL & CHEMICAL ENGINEERING CO., LTD., Yokohama-shi (JP)

( * ) Notice: Subject to any disclaimer, the term of this patent is extended or adjusted under 35 U.S.C. 154(b) by 726 days.

(21) Appl. No.: 14/000,657

(22) PCT Filed: Mar. 11, 2011

(86) PCT No.: PCT/JP2011/055786
§ 371 (c)(1),
(2), (4) Date: Aug. 21, 2013

(87) PCT Pub. No.: WO2012/124022
PCT Pub. Date: Sep. 20, 2012

(65) Prior Publication Data
US 2013/0327258 A1 Dec. 12, 2013

(51) Int. Cl.
| F23G 5/00 | (2006.01) |
| F23G 5/44 | (2006.01) |
| F23G 5/50 | (2006.01) |
| B65G 33/18 | (2006.01) |

(52) U.S. Cl.
CPC ............. *F23G 5/442* (2013.01); *B65G 33/18* (2013.01); *F23G 5/444* (2013.01); *F23G 5/50* (2013.01); *F23G 2201/80* (2013.01); *F23G 2205/10* (2013.01); *F23G 2205/121* (2013.01); *F23G 2207/101* (2013.01); *F23G 2207/20* (2013.01); *F23G 2208/00* (2013.01); *F23G 2208/10* (2013.01)

(58) Field of Classification Search
CPC ................................. F23G 5/033; C10B 31/08
USPC ................................................. 110/255–258
See application file for complete search history.

(56) References Cited

U.S. PATENT DOCUMENTS

| 2,510,240 | A | | 6/1950 | Mayo | |
| 3,362,887 | A | * | 1/1968 | Rodgers | .................. C10B 53/00 110/255 |
| 3,608,476 | A | * | 9/1971 | Price | .................... B30B 9/3075 100/215 |

FOREIGN PATENT DOCUMENTS

| EP | 1736527 A1 | | 12/2006 | |
| GB | 748981 A | * | 5/1956 | ............. F23G 5/002 |
| JP | 61-11519 A | | 1/1986 | |
| JP | 9-257227 A | | 9/1997 | |

(Continued)

OTHER PUBLICATIONS

Japanese Office Action dated May 27, 2014, issued in Japanese Patent Application No. 2013-504421, w/English translation (8 pages).

(Continued)

*Primary Examiner* — Jason Lau
(74) *Attorney, Agent, or Firm* — Westerman, Hattori, Daniels & Adrian, LLP

(57) ABSTRACT

A garbage supply device, which supplies waste to a gasification furnace that gasifies waste, includes a casing, two feed screws provided in the casing, and a middle shaft that is provided between the two supply screws, has a plurality of protrusions, and is repeatedly rotated forward or backward.

5 Claims, 6 Drawing Sheets

(56) References Cited

FOREIGN PATENT DOCUMENTS

| | | |
|---|---|---|
| JP | 10-019219 A | 1/1998 |
| JP | 2002-188806 A | 7/2002 |
| JP | 2003-42425 A | 2/2003 |
| JP | 2003-48626 A | 2/2003 |
| JP | 2003-65508 A | 3/2003 |
| JP | 2005-89056 A | 4/2005 |
| JP | 2006-224218 A | 8/2006 |
| JP | 2007-78239 A | 3/2007 |
| JP | 2007-253291 A | 10/2007 |
| JP | 2007-255444 A | 10/2007 |
| JP | 2008-82429 A | 4/2008 |
| JP | 2008-202897 A | 9/2008 |

OTHER PUBLICATIONS

Japanese Office Action dated Jan. 28, 2014, issued in Japanese Patent Application No. 2013-504421, w/English translation (6 pages).
International Search Report dated Apr. 26, 2011, issued in corresponding International Application No. PCT/JP2011/055786 with English translation (4 pages).
Written Opinion dated Apr. 26, 2011, issued in corresponding International Application No. PCT/JP2011/055786 with English translation (9 pages).
Extended European Search Report dated Feb. 27, 2015, issued in corresponding European Patent Application No. 11860891.8 (6 pages).

\* cited by examiner

US 9,869,472 B2

GARBAGE SUPPLY DEVICE

TECHNICAL FIELD

The present invention relates to a garbage supply device that supplies waste to a gasification furnace that gasifies waste.

BACKGROUND ART

Conventionally, gasification and ash melting systems are known as technologies capable of extensively treating waste such as not only municipal waste, but also noncombustible waste, burned residues, sludge, and buried waste. Such a gasification and ash melting system includes a gasification furnace pyrolyzing and gasifying the waste, a melting furnace that is provided downstream from the gasification furnace, burns a pyrolysis gas generated in the gasification furnace at a high temperature, and converts ash in the gas into a molten slag, and a secondary combustion chamber in which an exhaust gas discharged from the melting furnace is burnt. To convert the waste into a resource, to reduce a volume of waste, and to render the waste harmless, the slag is extracted from the melting furnace and is recycled into a construction material such as a road bed material, or waste heat is recovered from the exhaust gas discharged from the secondary combustion chamber and is used to produce electric power (e.g., see Patent Literature 1).

Conventionally, as a garbage supply device which supplies waste to a gasification furnace, a device in which the waste is supplied at a fixed quantity while being compressed by two feed screws installed on left and right sides of a casing in parallel is known.

CITATION LIST

Patent Literature

[Patent Literature 1]
Japanese Unexamined Patent Application, First Publication No. 2007-78239

SUMMARY OF THE INVENTION

Problem to be Solved by the Invention

However, when the waste is conveyed to the gasification furnace using the aforementioned conventional garbage supply device, there is a problem such that the waste is consolidated (a pressure is applied, and a volume is reduced) between the two feed screws and is get stuck in the casing.

Taking the abovementioned circumstances into account, the present invention is directed to provide a garbage supply device that prevents consolidation of conveyed waste.

Means for Solving the Problem

In order to accomplish the above object, the present invention employs the following means.

That is, a garbage supply device according to the present invention supplies waste to a gasification furnace which gasifies waste, and includes a casing, two feed screws provided in the casing, and a middle shaft that is provided between the two feed screws with a plurality of protrusions, and is repetitively rotated forward or backward between the two feed screws.

According to the garbage supply device according to the present invention, since the waste is stirred by the middle shaft on which the plurality of protrusions are provided and are not excessively supplied in between the two feed screws. Thereby, the waste can be prevented from being consolidated.

Further, the plurality of protrusions may include first protrusions that are provided at an upstream side and are formed in a prism shape, and second protrusions that are provided at a downstream side and are formed in a pyramid shape.

According to the present invention, the consolidation of the waste that is temporarily stored above the two feed screws can be prevented by the first protrusions of the upstream side, and the consolidation of the waste which occurs at a narrowed part can be prevented by the second protrusions of the downstream side. A narrowed part will be described below.

Further, the casing may include a narrowed part that narrows from the upstream side to a predetermined position, and the first protrusions and the second protrusions may be switched in the narrowed part.

According to the present invention, because the casing narrows, the waste can be conveyed at a fixed quantity.

Further, the feed screws may have a spiral pitch that increases in the downstream side from the narrowed part.

According to the present invention, as the shape of the protrusion and the spiral pitch of the feed screws are switched at a narrowed position, the consolidation at the upstream side can be prevented.

Further, the garbage supply device according to the present invention may include a hood provided above shaft sealing parts between rotation axes of the feed screws and the casing, the middle shaft and the casing, which covers the shaft sealing parts. A gas in the hood may be drawn by suction fans and flow into a downstream appliance.

According to the present invention, when unburnt gas leaks from the shaft sealing parts, it can be recollected without being scattered.

Effects of the Invention

According to the garbage supply device of the present invention, since the waste is not excessively supplied in between the two feed screws because of the middle shaft on which the plurality of protrusions are provided, the waste can be prevented from being consolidated.

DESCRIPTION OF EMBODIMENTS

Hereinafter, an exemplary embodiment of the present invention will be described in detail with reference to the drawings. Unless otherwise specified, any dimensions, materials, shapes, and relative arrangements of the various components described in the embodiment are not intended to limit the scope of the present invention thereto and are merely for the purpose of description.

Figure 1:
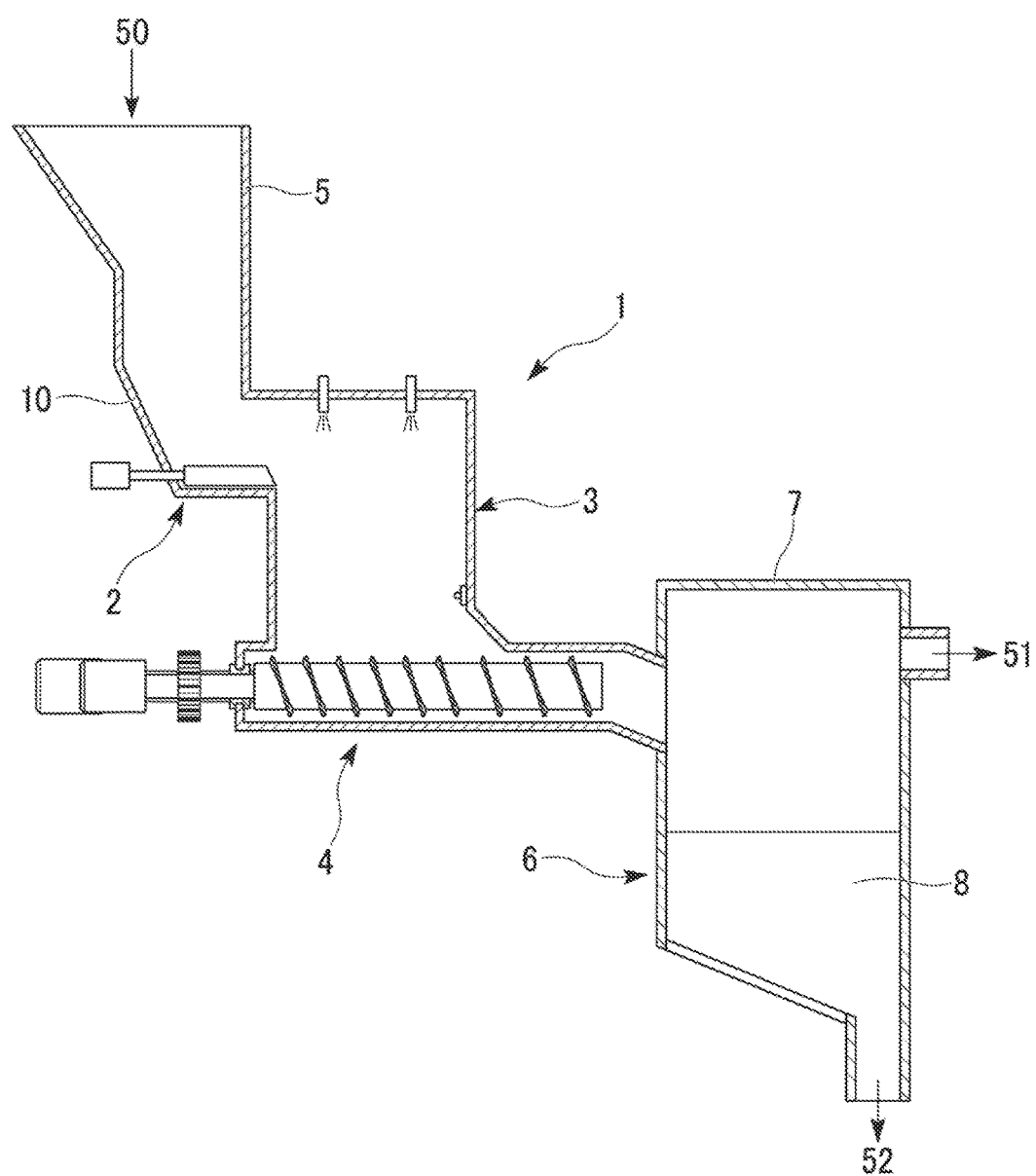
FIG. 1 is a constitutional view of a garbage supply device and a fluidized bed gasification furnace of an embodiment of the present invention.

As shown in FIG. 1, a garbage supply device 1 according to the present embodiment is a device that includes a pusher-type garbage supply device 2, a screw-type garbage supply device 4, and a connecting chute 3 which connects the pusher-type garbage supply device 2 and the screw-type garbage supply device 4. The garbage supply device 1 supplies waste 50 supplied from a garbage supply hopper 5 to a fluidized bed gasification furnace 6.

The fluidized bed gasification furnace 6 has a gasification furnace main body 7 and a fluidized bed 8 provided at a lower portion of the gasification furnace main body 7. To form the fluidized bed 8, air is blown from a lower side thereof for primary combustion, and fluidizes sand as a fluidization medium that is a heat transfer medium.

The waste charged into the fluidized bed gasification furnace 6 is dried and pyrolyzed in the fluidized bed 8. During those operations, noncombustibles 52 are discharged along with the fluidized sand. The waste is decomposed into gas, tar, and char (carbide) by pyrolysis. The tar is a component that is liquid at normal temperature, but it is present in the form of a gas in the gasification furnace. The char is gradually pulverized in the fluidized bed 8 of the fluidized bed gasification furnace 6 and is introduced into a cyclone melting furnace (not shown) as a pyrolysis gas 51 along with the gas and the tar.

Figure 2:
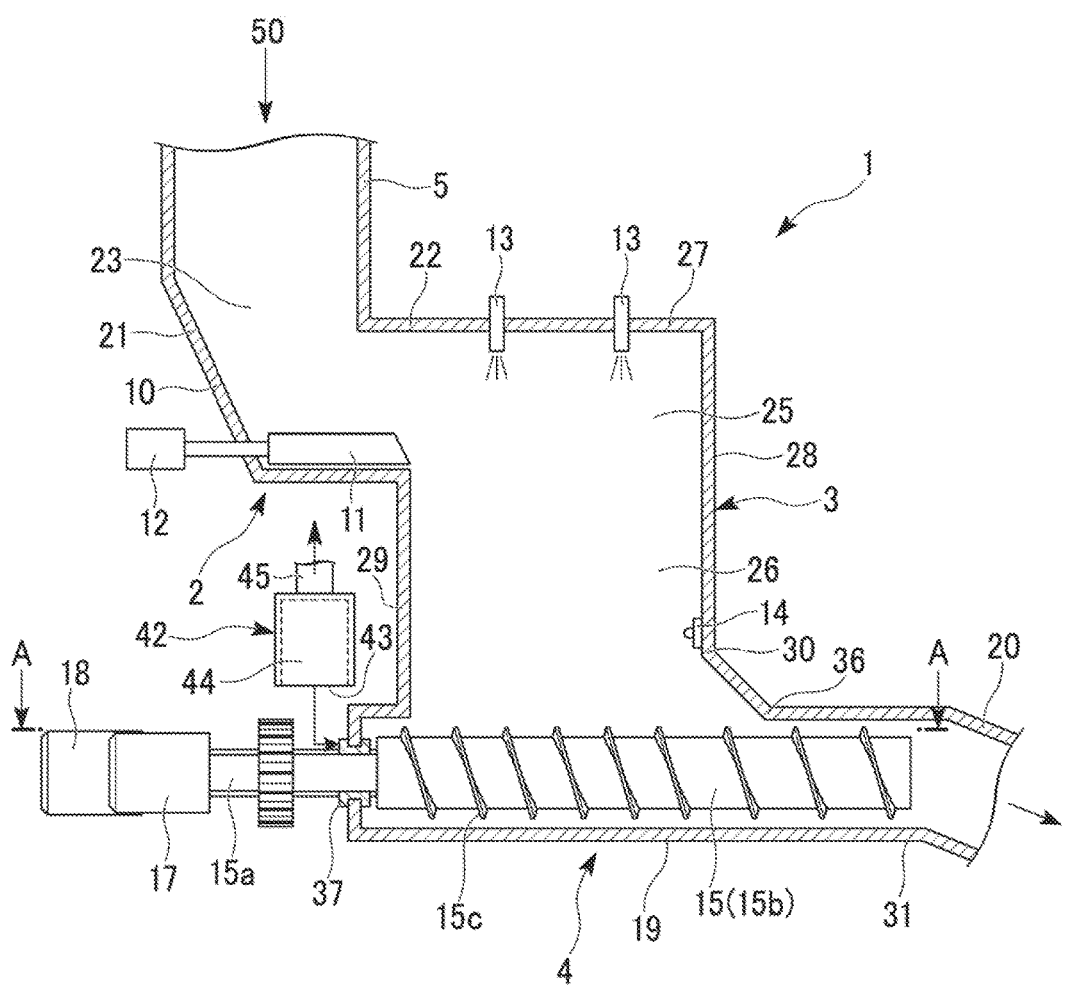
FIG. 2 is a schematic view of the garbage supply device of the embodiment of the present invention.

Next, details of the garbage supply device 1 will be described with reference to FIG. 2.

The garbage supply device 1 includes the pusher-type garbage supply device 2 pushing out the waste supplied from the garbage supply hopper 5, the connecting chute 3 into which the waste pushed out from the pusher-type garbage supply device 2 are charged, and the screw-type garbage supply device 4 that is provided at a lower portion of the connecting chute 3 and discharges the waste stored in the connecting chute 3 to the fluidized bed gasification furnace 6.

The pusher-type garbage supply device 2 is configured of a casing 10 having an inlet 21 coupled with the garbage supply hopper 5 and an outlet 22 coupled with the connecting chute 3, a rectangular parallelepiped pusher 11 widened in a horizontal direction, and a hydraulic cylinder 12 slidably driving the pusher 11. A vertical space between the casing 10 and the pusher 11 has a size that is nearly equal to that of a cross-sectional space of a lower portion 23 of the garbage supply hopper 5.

Hereinafter, a forward movement direction of the sliding direction of the pusher 11 is referred to as forward (rightward in FIG. 2), and a backward movement direction is referred to as backward. Further, these are collectively referred to as a front-back direction.

The connecting chute 3 is provided to extend downward from the outlet 22 of the pusher-type garbage supply device 2. The connecting chute 3 is made up of an upper portion 25 and a lower portion 26. The upper portion 25 has the shape of a rectangular parallelepiped in which a space of the outlet 22 of the pusher-type garbage supply device 2 extends forward. The lower portion 26 has a shape that remains constant in a front-back direction and narrows in a widthwise direction toward the center.

An upper surface 27 of the connecting chute 3 is provided with a plurality of fire extinguishing units 13. Each fire extinguishing unit 13 is a water spray type fire extinguishing unit that covers a target with a fog of water droplets ejected from a nozzle and extinguishes fire. The nozzle of the fire extinguishing unit 13 is directed downward from the upper surface 27 of the connecting chute 3 and is set to extinguish fire on the screw-type garbage supply device 4. The fire extinguishing units 13 are connected to a water supply facility such as a pump (not shown).

Further, a front wall part 28 of the connecting chute 3 is provided with a temperature sensor 14. As the temperature sensor 14 in the present embodiment, a thermocouple is used. The temperature sensor 14 is constituted so as to detect the temperature of a casing 19 of the screw-type garbage supply device 4 to be described below.

The screw-type garbage supply device 4 is configured of two feed screws 15 below an inlet 30 thereof side by side so as to have parallel axes. A middle shaft 16 is provided between the feed screws 15. The middle shaft 16 is formed in such a manner that a plurality of protrusions 24 protrude from an outer circumference of a rod-shaped or cylindrical shaft in a circumferential direction at a constant pitch. The middle shaft 16 and the feed screws 15 are disposed so that axes thereof are aligned in parallel.

The two feed screws 15 are rotatably driven by a drive motor 17. A driving force of the drive motor 17 is transmitted to the feed screws 15 by a plurality of gears 17a. The gears 17a are set to rotate each of the two feed screws 15 in opposite directions each other.

The middle shaft 16 is driven by a hydraulic motor 18. The middle shaft 16 is set to repeat forward and backward rotations by controlling a switching valve (not shown).

Figure 5:
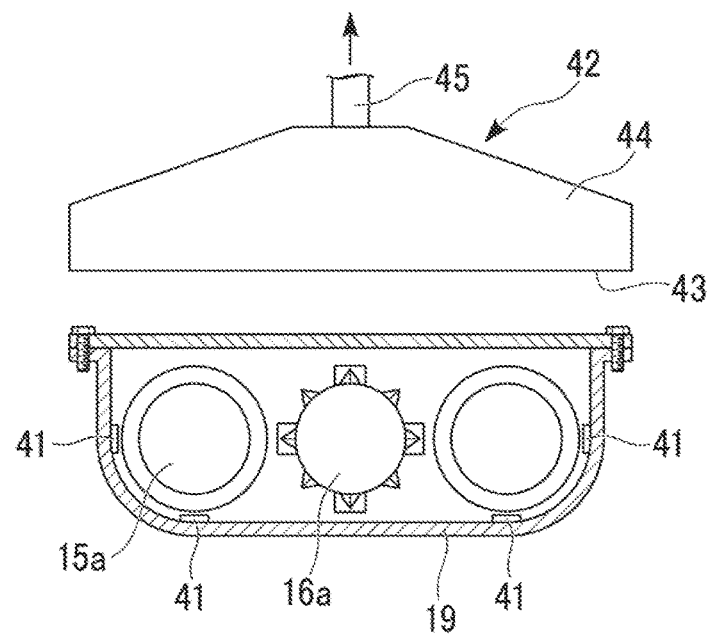
FIG. 5 is a cross-sectional view taken along line C-C of FIG. 3.

Furthermore, the screw-type garbage supply device 4 includes the casing 19. The casing 19 is formed of abrasion resistant steel whose hardness is equal to or higher than HB 400 at normal temperature. The casing 19 covers both of the feed screws 15 and the middle shaft 16, has the inlet 30 which communicates with the outlet 29 of the connecting chute 3, and forms an outlet 31 in front of ends of both of the feed screws 15 and the middle shaft 16. Further, the casing 19 has a shape in that gradually narrows from the inlet 30 in the forward direction. In a narrowed part 36, a cross-sectional shape of the casing 19 is formed so that the distance between the feed screws 15 and the middle shaft 16 and between the feed screws 15 and the casing 19 is minimized as shown in FIG. 5. Further, a passage 20 extending to the fluidized bed gasification furnace 6 is connected to the outlet 31 of the screw-type garbage supply device 4

The drive motor 17 driving the feed screws 15 and the hydraulic motor 18 driving the middle shaft 16 are provided outside the casing 19. A shaft sealing part 37 is provided between the shaft 15a of the feed screw 15 and the casing 19 and between the shaft 16a of the middle shaft 16 and the casing 19. Hereinafter, the shaft sealing part 37 provided on the shaft 15a of the feed screw 15 will be described as an example.

Figure 6:
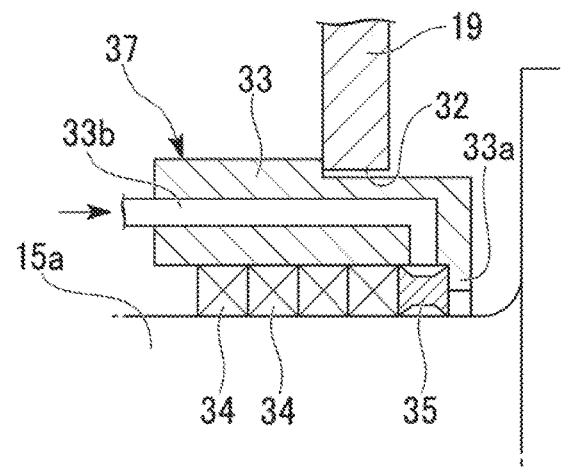
FIG. 6 is an enlarged view of a shaft sealing part.

As shown in FIG. 6, the shaft sealing part 37 seals the space between a through-hole 32 formed in the casing 19 and the shaft 15a of the feed screw 15. The shaft sealing part 37 includes a packing main body 33 which covers a portion which constitutes an outer circumferential surface of the shaft 15a and faces the through-hole 32 throughout a circumference thereof, and ground packings 34 and a lantern ring 35 interposed between the packing main body 33 and the shaft 15a.

The packing main body 33 formed in an annular shape is configured such that an outer circumference thereof is in close contact with the through-hole 32 and an inner circumference thereof is in close contact with the plurality of ground packings 34 and the lantern ring 35. Further, one end of the inner circumferential surface of the packing main body 33 which faces the interior of the casing 19 is provided with a protruding part 33a which protrudes in a radial inward direction of the shaft 15a. Furthermore, the packing main body 33 is provided with an oil supply passage 33b for lubricating the lantern ring 35, and an oil supply hose (not shown) is connected to the oil supply passage 33b.

Likewise, the plurality of ground packings 34 and the lantern ring 35 are also formed in an annular shape, outer circumferential surfaces thereof are in close contact with the inner circumferential surface of the packing main body 33, and inner circumferential surfaces thereof are in close contact with the outer circumferential surface of the shaft 15a. The lantern ring 35 is disposed inside the casing 19 so as to be in contact with the protruding part 33a. However, without being limited to this position, the lantern ring 35 may be disposed in the middle between the plurality of ground packings 34.

Next, details of the middle shaft 16 will be described with reference to FIG. 4.

Figure 4:
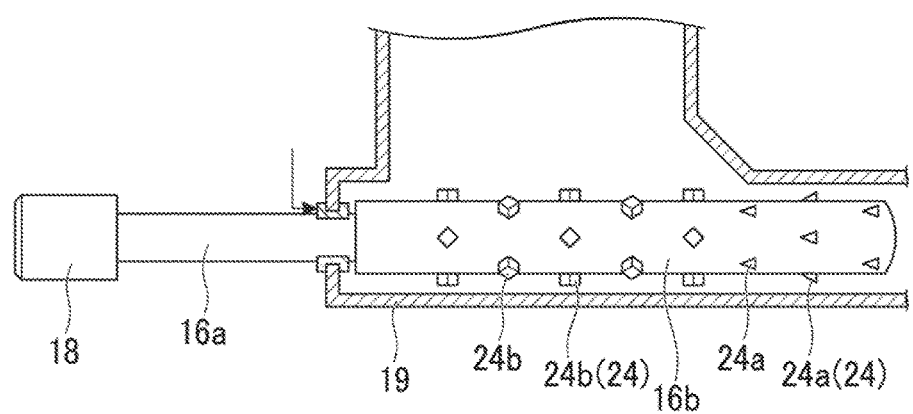
FIG. 4 is a cross-sectional view taken along line B-B of FIG. 3.

As shown in FIG. 4, the middle shaft 16 is made up of a cylindrical middle shaft main body 16b and a plurality of protrusions 24 provided on an outer circumference of the middle shaft main body 16b.

The protrusions 24 are configured so that a plurality of protrusion rows, in each of which the plurality of protrusions are formed in a circumferential direction of the middle shaft 16, are formed in an axial direction. Each protrusion row is configured of four protrusions 24 formed at intervals of 90°. Further, the neighboring protrusion rows are disposed in an alternating position. In the present embodiment, there are eight protrusion rows. Among them, the front three rows (downstream side) of protrusions are triangular protrusions 24a having triangular pyramid shapes, and the rear five rows (upstream side) of protrusions are quadrangular protrusions 24b having quadrangular prism shapes.

Figure 7:
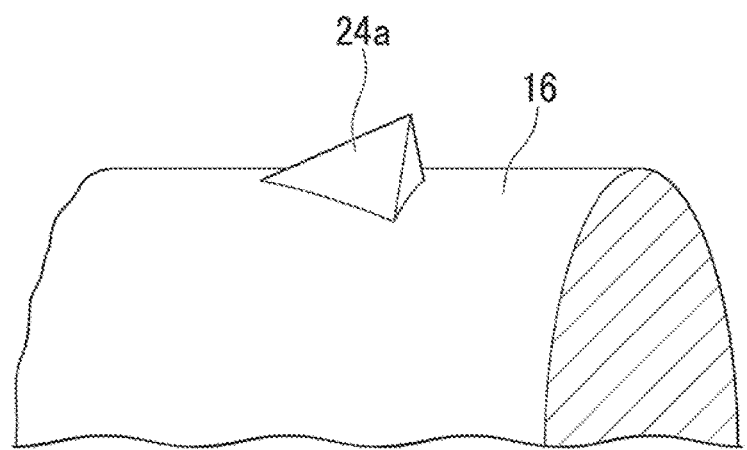
FIG. 7 is a detailed view of a second protrusion.
Figure 8:
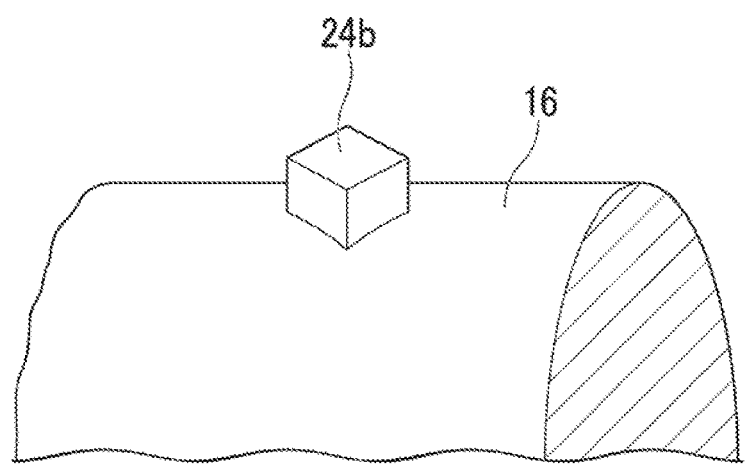
FIG. 8 is a detailed view of a first protrusion.

As shown in FIG. 7, the triangular protrusion 24a is formed so that one of three faces of the triangular pyramid constituting the triangular protrusion 24a is directed to the front (side of the outlet 31 of the casing 19). Further, the triangular protrusion 24a is disposed between the aforementioned narrowed part 36 and the outlet 31. That is, as shown in FIG. 5, the triangular protrusions 24a are formed in a section in which the distance between the casing 19 and the middle shaft 16 and the distance between the feed screw 15 and the middle shaft 16 is minimized.

The feed screw 15 is made up of a cylindrical feed screw main body 15b and a screw 15c formed on an outer circumference of the feed screw main body 15b. The screw 15c is formed by winding a planar body on the outer circumference of the feed screw main body 15b in a spiral shape. An abrasion-resistant processing and a hardening treatment are applied to the screw 15c.

Figure 3:
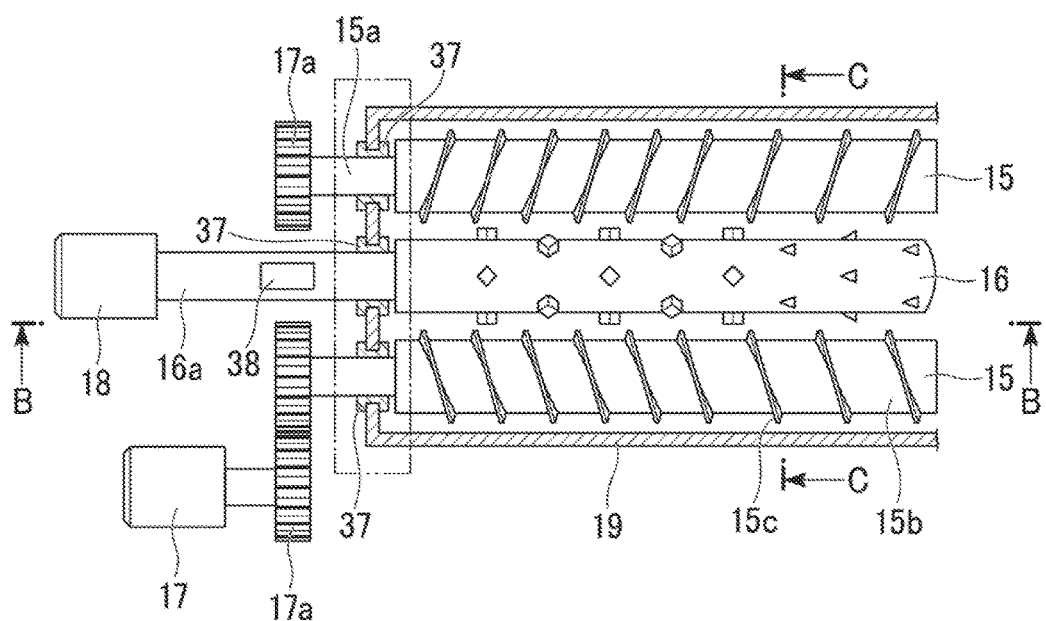
FIG. 3 is a cross-sectional view taken along line A-A of FIG. 2.

As shown in FIG. 3, the shaft 16a of the middle shaft 16 is provided with a rotation sensor 38.

Figure 9:
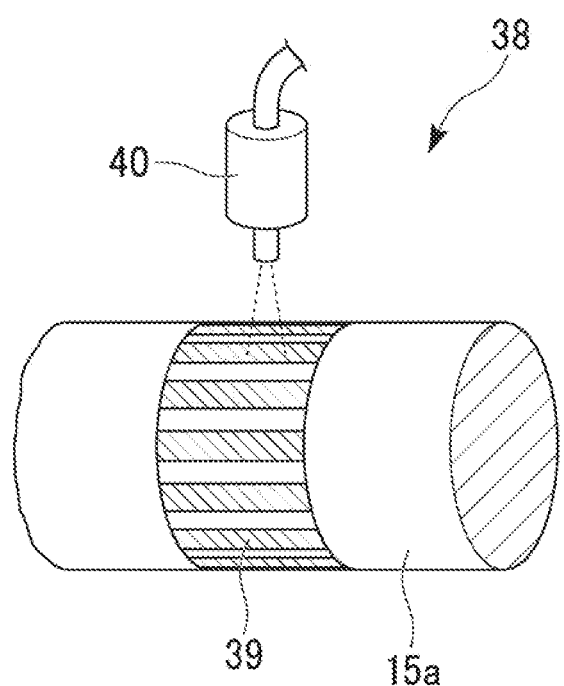
FIG. 9 is a detailed view of a rotation sensor.

As shown in FIG. 9, the rotation sensor 38 is configured of a striped pattern 39 patterned in a circumferential direction of the shaft 16a and a photosensor 40 disposed above the striped pattern 39. The striped pattern 39 is formed in such a manner that a white portion and a black portion are alternately exposed when the shaft rotates. The photosensor 40 is a reflective photosensor and is set to detect a quantity of light that reaches and is reflected from the striped pattern 39 and to determine whether or not the shaft 16a is rotated.

In the present embodiment, the striped pattern 39 is patterned on the shaft 16a. However, a coupling may be provided between the shaft 16a and the hydraulic motor 18, and such a striped pattern may be patterned on the coupling.

As shown in FIG. 5, the casing 19 is provided with a plurality of steady rests 41 on an inner surface thereof. The steady rests 41 are formed as flat bars provided in a direction of the shaft of the feed screw 15, and a thickness thereof is set to be equal to a gap between a rotation locus of the screw 15c and the inner surface of the casing 19. The steady rests 41 are disposed below and beside the center of the shaft of the feed screw 15 so that longitudinal directions thereof are parallel, and the steady rests 41 and the screw 15c are in contact with each other at all times.

A hood 42 is provided above the shaft sealing part 37 outside the casing 19. The hood 42 is configured of a hood main body 44 having an opening 43 at an upper side and a pipe 45 connected to an upper surface of the hood main body 44. The hood main body 44 has the shape of a box extended in a direction that intersects the shafts so as to at least cover upper sides of the feed screws 15 and the shaft sealing part 37 of the middle shaft 16. As described above, a lower surface of the hood main body 44 is open to serve as the opening 43. Further, the pipe 45 connected to an upper surface of the hood main body 44 is constituted so as to communicate with the interior of the gasification furnace main body 7 of the fluidized bed gasification furnace 6. Further, a plurality of fans (not shown) is disposed in the opening 43 in a direction in which a gas below the fans is introduced. Alternatively, the pipe 45 may be connected to not only the fluidized bed gasification furnace 6 but also another downstream appliance.

Next, an operation of the garbage supply device 1 of the present embodiment will be described.

First, as shown in FIG. 1, the waste 50 is supplied from the garbage supply hopper 5 and flows into the connecting chute 3 via the casing 10. Here, the waste is pushed out toward the connecting chute 3 by the proper pusher-type garbage supply device 2.

First, the waste is accommodated at an upstream side from the narrowed part 36 in the casing 19 of the screw-type garbage supply device 4. Here, the waste is convoluted into a screw trough of the feed screw 15 and conveyed while being temporarily stored above the feed screw 15. Since the waste is stirred by the quadrangular protrusions 24b of the middle shaft 16, the waste is not consolidated.

Next, the waste is conveyed to a downstream side from the narrowed part 36. Here, the waste is compressed, but are not consolidated because they are stirred by the triangular protrusions 24a whose tips are sharp. Further, as the spiral pitch of the screw 15c increases at the downstream side from the narrowed part 36, the waste is prevented from being consolidated due to the narrowed in the casing 19.

Further, in the garbage supply device 1 of the present embodiment, a control unit (not shown) monitors a measured value of the temperature sensor 14 at all times. If the temperature sensor 14 detects a rise in temperature of the casing 19, the control unit transmits a signal to the fire extinguishing units 13, and water is sprayed into the garbage supply device 1. Thereby, a fire can be prevented in the garbage supply device 1.

Further, in case that unburnt gas leaks from the shaft sealing part, the unburnt gas flows into the hood 42 installed above the shaft sealing part 37 and is returned to the downstream appliance such as a gasification furnace. Thereby, the unburnt gas can be prevented from being filled in the entire device.

According to the embodiment, since the waste charged into the casing 19 from the connecting chute 3 are stirred by the quadrangular protrusions 24b of the middle shaft 16, the waste is prevented from being consolidated by the two feed screws 15.

Further, since the steady rests 41 are provided on the inner surface of the casing 19, the vibrations of the shaft of the tip of the feed screw 15 can be prevented.

Further, as the lantern ring 35 is provided on the shaft sealing part 37, the leakage of the unburnt gas from the shaft 15a of the feed screw 15 and the shaft 16a of the middle shaft 16 can be more reliably prevented.

Also, the casing 19 is formed of abrasion resistant steel whose hardness at normal temperature is equal to or higher than HB 400, and an abrasion-resistant processing and a hardening treatment are applied to the screw 15c of the feed screw 15. Thereby, damage caused by friction between the waste and the screw 15c, the waste and the casing 19 can be prevented.

Furthermore, as the rotation sensor 38 is provided on the shaft 16a of the middle shaft 16, a malfunction of the middle shaft 16 and a reversal of the rotation can be detected.

The technical scope of the present invention is not limited to the aforementioned embodiment, and various modifications may be made without departing from the scope of the present invention. For example, in the present embodiment, the quadrangular protrusions 24b of the upstream side are formed in the quadrangular prism shapes, and the triangular protrusions 24a of the downstream side are formed in the triangular pyramid shapes. However, the present invention is not limited thereto. The quadrangular protrusions 24b may be formed, for instance, in cylindrical shapes as long as they have shapes suitable for the stirring of the waste which prevents the waste charged from the connecting chute 3 from being consolidated. Further, the triangular protrusions 24a may have shapes in which, as the casing 19 narrows, the waste that tends to consolidate is crushed into, for example, conical shapes.

REFERENCE SIGNS LIST

1 garbage supply device
6 gasification furnace
15 feed screw
16 middle shaft
19 casing
24 protrusion
24a triangular protrusion (second protrusion)
24b quadrangular protrusion (first protrusion)
36 narrowed part
37 shaft sealing part
42 hood

What is claimed is:

1. A garbage supply device that supplies waste to a gasification furnace gasifying waste, the garbage supply device comprising:
   a casing;
   two feed screws provided in the casing;
   a middle shaft that is located between the two feed screws, has a plurality of protrusions, and is repetitively rotated forward or backward; and
   a hood provided above shaft sealing parts and covers the shaft sealing parts, the shaft sealing parts being provided between rotation axes of the feed screws and the casing, and the shaft sealing parts being provided between rotation axes of the middle shaft and the casing,
   wherein the hood is configured of a hood main body and a pipe connected to the hood main body,
   wherein the shaft sealing parts include a packing main body, a ground packing, and a lantern ring,
   wherein the packing main body is arranged between a through-hole formed in the casing and the rotation axes of the feed screws and the middle shaft, and covers a portion which constitutes an outer circumferential surface of the rotation axes and faces the through-hole throughout a circumference thereof,
   wherein the ground packing and the lantern ring are interposed between the packing main body and the rotation axes,
   wherein the packing main body is provided with an oil supply passage configured to lubricate the lantern ring,
   wherein a gas in the hood is drawn by suction fans and flows into a downstream appliance.

2. The garbage supply device according to claim 1, wherein the plurality of protrusions include first protrusions that are provided at an upstream side and are formed in prism shapes and second protrusions that are provided at a downstream side and are formed in pyramid shapes.

3. The garbage supply device according to claim 2, wherein the casing includes an narrowed part that narrows from an upstream side to a predetermined position, and the first protrusions and the second protrusions are switched in the narrowed part.

4. The garbage supply device according to claim 3, wherein the feed screws have a spiral pitch that increases at the downstream side from the narrowed part.

5. The garbage supply device according to claim 1, further comprising:
   a fire extinguishing unit which is provided above two feed screws and the middle shaft and which sprays water; and
   a temperature sensor which detects a temperature of the casing,
   wherein the fire extinguishing unit sprays water, when the temperature sensor detects a rise in temperature of the casing.

* * * * *